May 23, 1950 H. RICHTER 2,508,687
APPARATUS FOR FOOTING GLASSWARE
Filed March 28, 1944 8 Sheets-Sheet 3

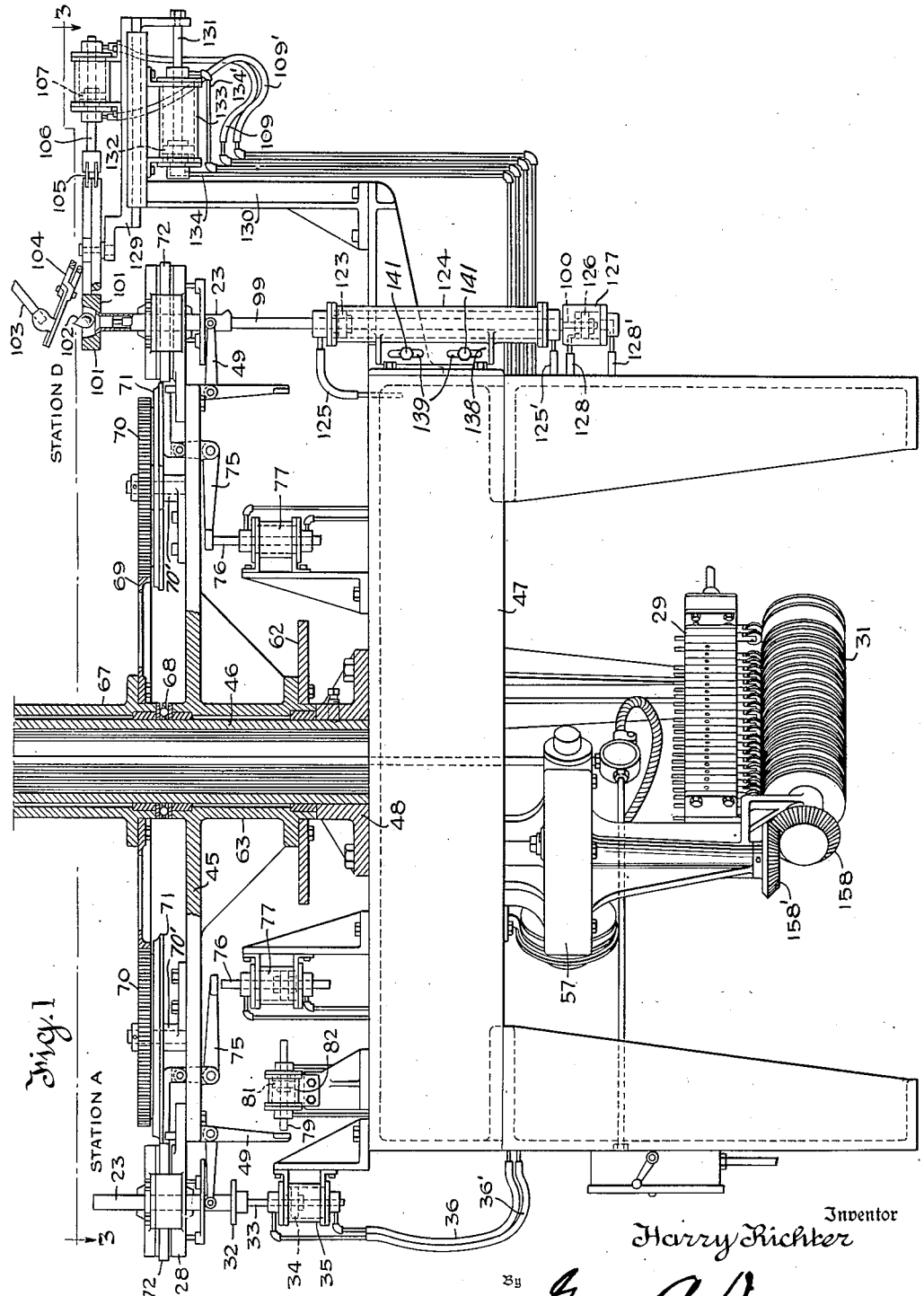

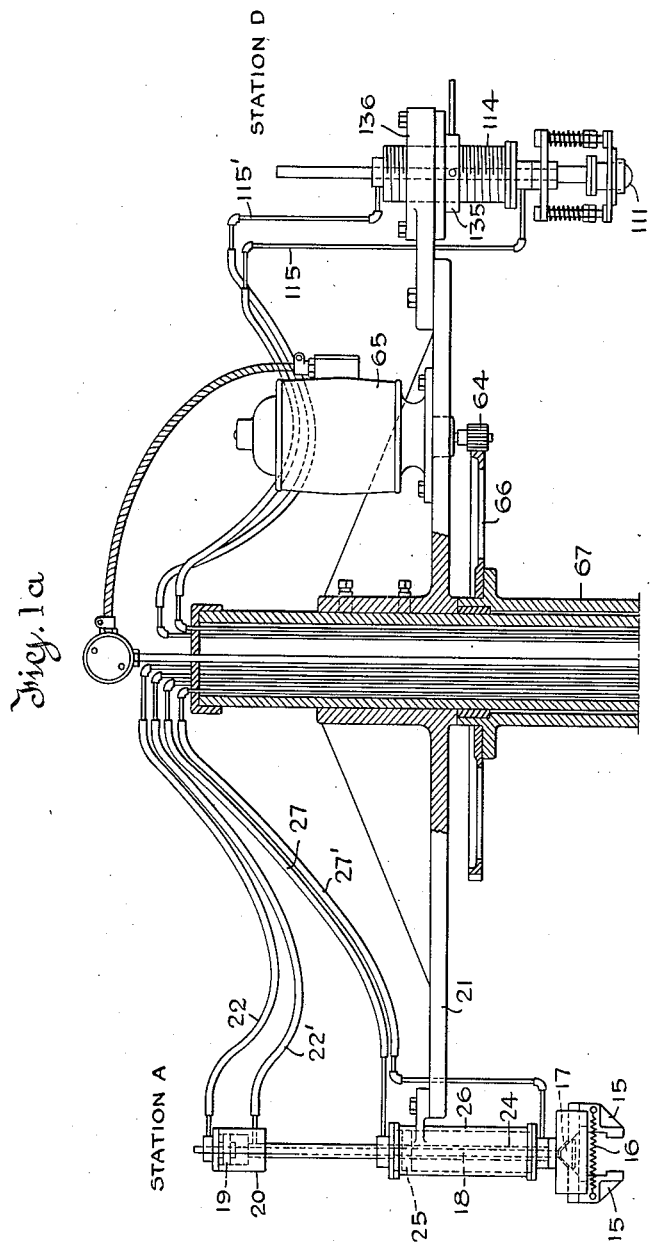

Inventor
Harry Richter
By George A. Degnau
Attorney

May 23, 1950 H. RICHTER 2,508,687
APPARATUS FOR FOOTING GLASSWARE
Filed March 28, 1944 8 Sheets-Sheet 5

Inventor
Harry Richter
By George A. Degner
Attorney

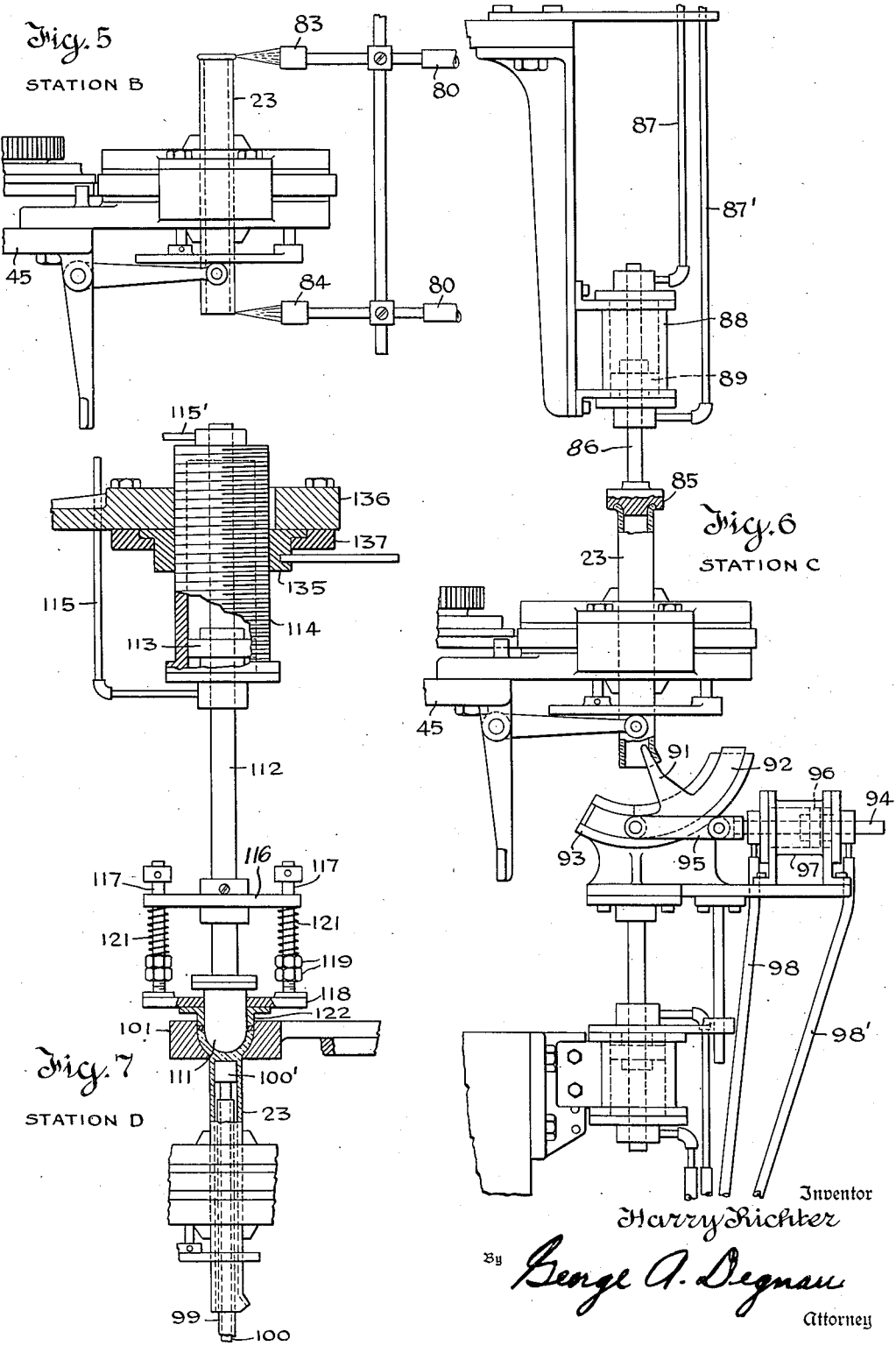

May 23, 1950 H. RICHTER 2,508,687
APPARATUS FOR FOOTING GLASSWARE
Filed March 28, 1944 8 Sheets-Sheet 7
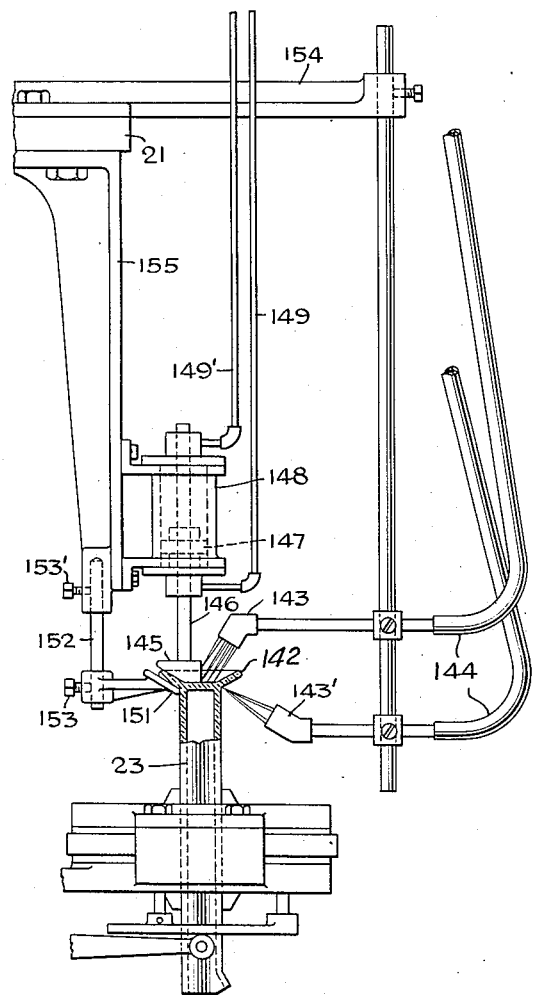
Fig. 8
STATION E
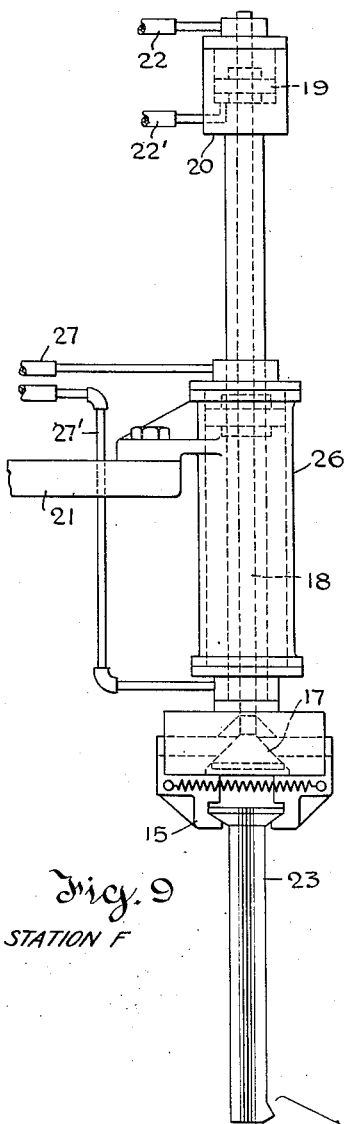
Fig. 9
STATION F
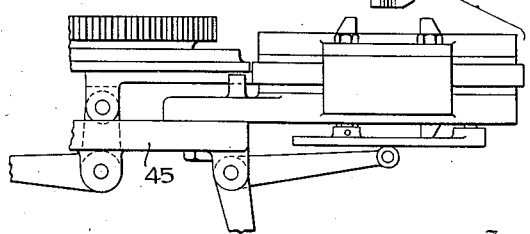
Inventor
Harry Richter
By George A. Degnau
Attorney May 23, 1950   H. RICHTER   2,508,687
APPARATUS FOR FOOTING GLASSWARE
Filed March 28, 1944   8 Sheets-Sheet 8

Inventor
Harry Richter
By George A. Degnan
Attorney

Patented May 23, 1950

2,508,687

UNITED STATES PATENT OFFICE 2,508,687

APPARATUS FOR FOOTING GLASSWARE

Harry Richter, Vineland, N. J., assignor, by mesne assignments, to Owens-Illinois Glass Company, Toledo, Ohio, a corporation of Ohio Application March 28, 1944, Serial No. 528,460

4 Claims. (Cl. 49—1)

This application is a continuation in part of my co-pending application, Serial No. 387,305, filed April 7, 1941, now abandoned. The invention relates to a method and apparatus for footing glassware and more particularly forming a foot or base on a container such as a graduated cylinder.

In one of the widely used methods of producing footed ware of the type referred to, a gob of softened glass is deposited on the bottomed end of a jar and tooled to form thereon the desired shape of foot. Usually the bottom of the jar is blown in a mold. In this method a fillet is formed at the junction of the side wall with the base and, since the formation of the fillet is uncontrolled, its volume varies in each jar. For this reason it is necessary to test each jar before incising or otherwise fixing graduation lines on the jar.

One of the objects of the present invention is to form a foot on a cylindrical blank, the blank being open instead of bottomed so that strains present in jars made by former methods are obviated.

Another object of the invention is to form the foot on the cylindrical blank in such a manner that fillets are eliminated or at least controlled so that jars having regularly shaped internal sides and bottoms are produced.

Other objects will be apparent from the following description of the invention taken in connection with the accompanying drawings in which Fig. 1 is an elevation, partly in section, of the lower part of a preferred embodiment of a machine illustrating the invention;

Fig. 1a is an elevation, partly in section, of the upper part of the machine;

Fig. 5 is a fragmentary elevation of certain parts of the machine designated as station B wherein a cylindrical glass blank is held in a rotatable chuck and the ends thereof are fire finished;

Fig. 6 is a fragmentary elevation of certain parts of the machine designated as station C at which the bottom end of the cylindrical blank is pressed and a pour-out is formed at the other end of the blank;

Fig. 7 is a fragmentary elevation of certain parts of the machine designated as station D wherein the foot and bottom are preliminarily shaped;

Fig. 8 is a fragmentary elevation of certain parts of the machine designated as station E wherein the final operation of shaping the foot is effected;

Fig. 9 is a fragmentary elevation of certain parts of the machine designated as station F illustrating mechanism for withdrawing the finished product from its holding chuck;

Fig. 11 is a partial top plan view of the chuck mounting assembly; and

Figure 10:
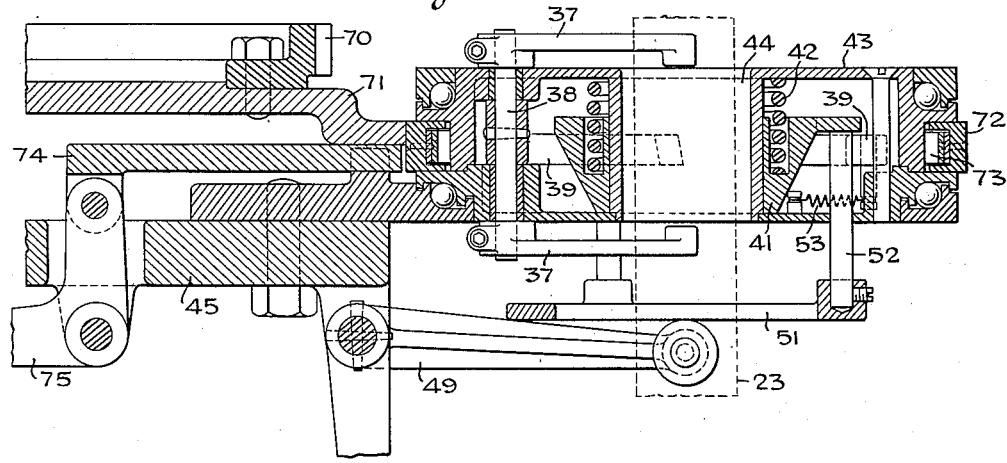
Fig. 10 is a section taken through the chuck mounting assembly.

In the drawings it will be seen that the stations are preferably, but not necessarily, equally spaced apart and that the several shaping operations are carried out in timed sequence. Referring to Figs. 1 and 1a, it will be seen that a pair of jaws 15, normally held closed by spring 16, are adapted to be opened by a conical cam 17 on plunger 18, the latter having at its other end a piston 19 in cylinder 20 secured to stationary spider 21 and to which compressed air is admitted and exhausted therefrom through hose connections 22, 22'. The jaws when closed are adapted to clamp the cylindrical blank 23. In Fig. 1a the jaws are shown as attached to a hollow plunger 24 having a piston 25 secured thereto intermediate its ends. The piston is elevated and lowered within cylinder 26, hose connections 27, 27' admitting and exhausting compressed air to and from the cylinder, respectively. As shown, the jaws are open and elevated. An operator places a blank in the jaws which, at the proper time, automatically close to hold the blank therebetween. The jaws are then lowered to position the blank in a rotary chuck 28 shown in detail in Fig. 10, whereupon the jaws open and are again elevated. Suitable valves in the bank indicated at 29 in Fig. 1 and actuated by cams indicated at 31, supply compressed air to the cylinders to reciprocate pistons 19 and 25 in the proper timed sequence. It is to be noted that plunger 18 is slidable within hollow plunger 24 and that cylinder 20 rises and falls with plunger 24.

When the blank is lowered into chuck 28 its lowermost position is limited by gauge plate 32, shown in Fig. 1 as being in its elevated position. The gauge plate is mounted on plunger 33 having a piston 34 thereon, the latter being in cylinder 35 and adapted to be raised and lowered by compressed air supplied through hose connections 36, 36'. After the blank is clamped in the chuck, the guide plate is lowered. The chuck is shown in detail in Figs. 10 and 11 and the mechanism for opening the chuck is illustrated in Fig. 1. In these figures, as well as in Fig. 3, it will be seen that the chuck comprises three pairs of jaws 37, each pair being fast on a rotatable pintle 38. Also secured to each pintle is an arm 39 having its free end tangentially engaging and cooperating with a conical cam 41 normally holding the chuck jaws closed by means of a spring 42 bearing against the cam and housing 43. The housing is provided with a central opening 44 in which the glass blank is positioned when clamped by the jaws.

The chucks, of which there are six in number in the embodiment illustrated in the drawings, are mounted on a spider 45 rotatable on hollow column 46 mounted on base 47 and held thereon by collar 48 bolted to the base. Pivotally mounted on spider 45 adjacent each of the chucks is a bell crank 49 cooperating with a ring 51 having pins 52 thereon adapted to engage cone 41 to lift the latter against spring 42. As the cone is elevated, springs 53 rock arms 39 and jaws 37 to nonclamping position.

Having described the manner in which the glass blank is deposited in one of the chucks at station A, it will be noted that chuck-carrying spider 45 is intermittently rotated about the central column at predetermined timed intervals. In this respect it will be seen that a motor 54 drives pulley 55 which, in turn, drives pulley 55' (see Fig. 4) through belt 56, the latter pulley being fast on worm shaft 57 driving a worm wheel in housing 58. The worm wheel is secured to shaft 59 having at its upper end a crank 61 adapted to cooperate with a Geneva gear 62 secured to a cylindrical extension 63 of spider 45. It will, therefore, be seen that, through the Geneva mechanism, the spider and the chucks carried thereby are moved intermittently to successive stations.

The means for rotating the chucks is illustrated in Figs. 1, 1a, 3, 10 and 11. Pinion 64 on the shaft of motor 65 drives gear 66 fixed to the upper end of sleeve 67, the lower end of which rests on bearing 68, the latter being supported on spider 45. Secured to sleeve 67 adjacent the lower end thereof is a second gear 69 meshing with six gears indicated at 70. The latter are rotatable in bearings 70', these bearings being fixed to spider 45 and rotatable therewith. Secured to each of the gears 70 is a circular plate 71, the periphery of which is engageable with ring 72 on the chuck housing. This ring is so mounted on the chuck that relative movement thereof radially of the chuck is permitted. Normally the chuck is rotatable with ring 72 through spring members 73 which frictionally engage the chuck housing, but, at the same time, permit the relative radial movement between the ring and the housing referred to. Rotation of the chucks is arrested by arm 74 pivotally connected to bell-crank 75 and movable toward and away from ring 72 when the bell-crank is rocked. Rocking of the bell-crank is effected by plunger 76 actuated by compressed air supplied to cylinder 77. It is to be noted that there is a separate plunger 76 and cylinder 77 for each of the six chucks. It will also be seen that bell-crank 49 is rocked by plungers 79 having pistons 81 thereon actuated by compressed air in cylinders 82 at stations A and F.

Figure 2:
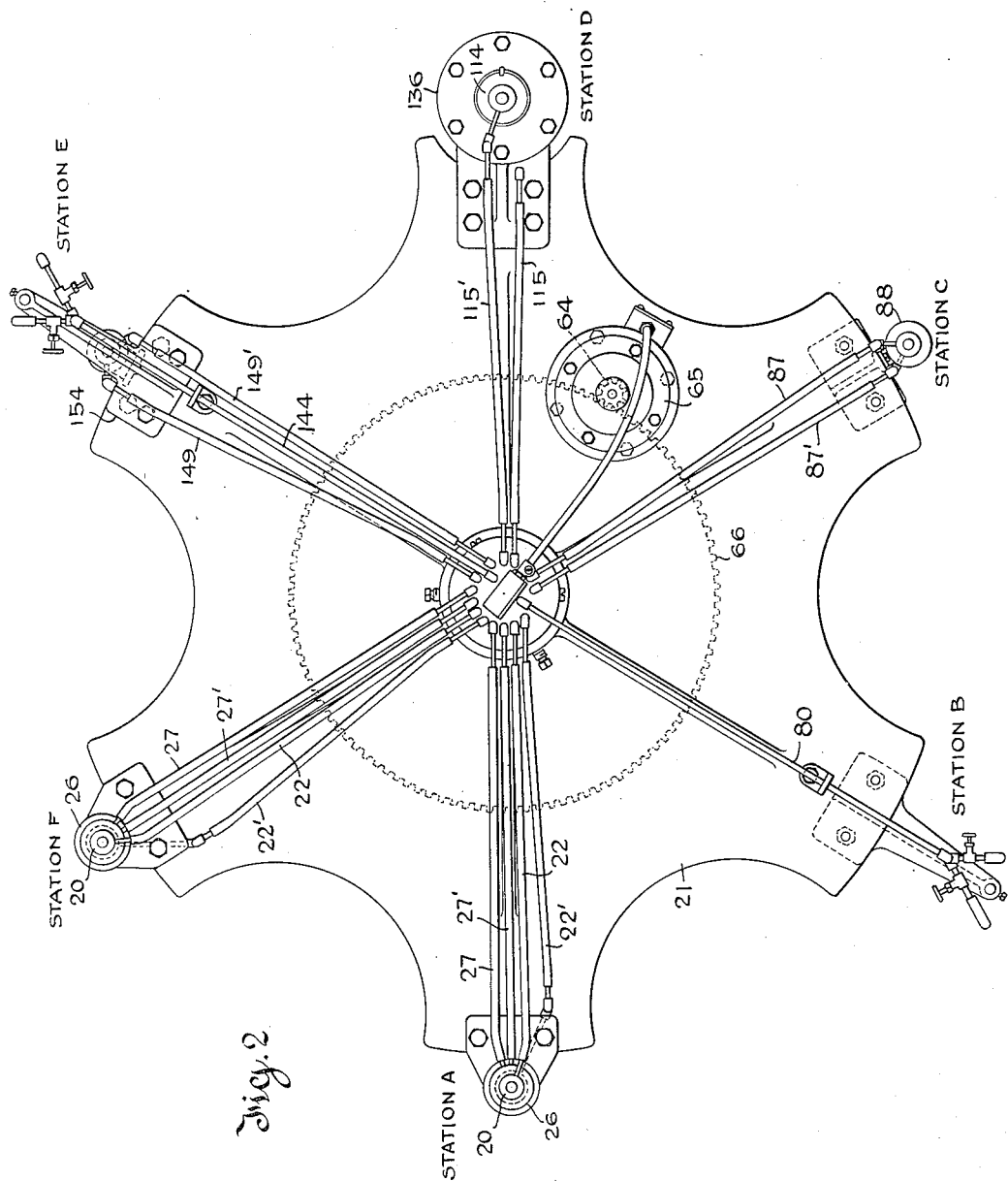
Fig. 2 is a top plan view of the stationary plate supporting mechanisms designed to perform certain operations at successive stations during the steps necessary to shape the foot on the ware.

Referring to Figs. 2 and 5, at station B, the ends of the cylindrical blank are heated, while the blank is rotating, by fires from burners 83, 84, to fire finish the ends and remove any rough edges. At the same time these ends are softened for the next subsequent operation. The upper end is heated sufficiently to form an annular bead thereon. Gas for the burners is supplied through hose connection 80.

At stations C, Fig. 6, while the ends of the blank are still plastic, the upper or bead end of the blank is flared and evenly shaped by a die 85 secured to the lower end of a vertically reciprocable plunger 86 actuated by compressed air supplied through hose connections 87, 87' to cylinder 88 and acting on piston 89 fixed to the plunger. The die is brought into engaging relation with the blank as the chuck is aligned therewith. At the same time a pour-out is formed on the lower end of the blank by finger 91 on sliding member 92 mounted in an arcuate guide 93. A rocking motion is imparted to the finger by plunger 94 connected thereto, by link 95, the plunger having secured thereto a piston 96 acted upon by compressed air supplied to cylinder 97 by hose connections 98, 98'.

Figure 3:
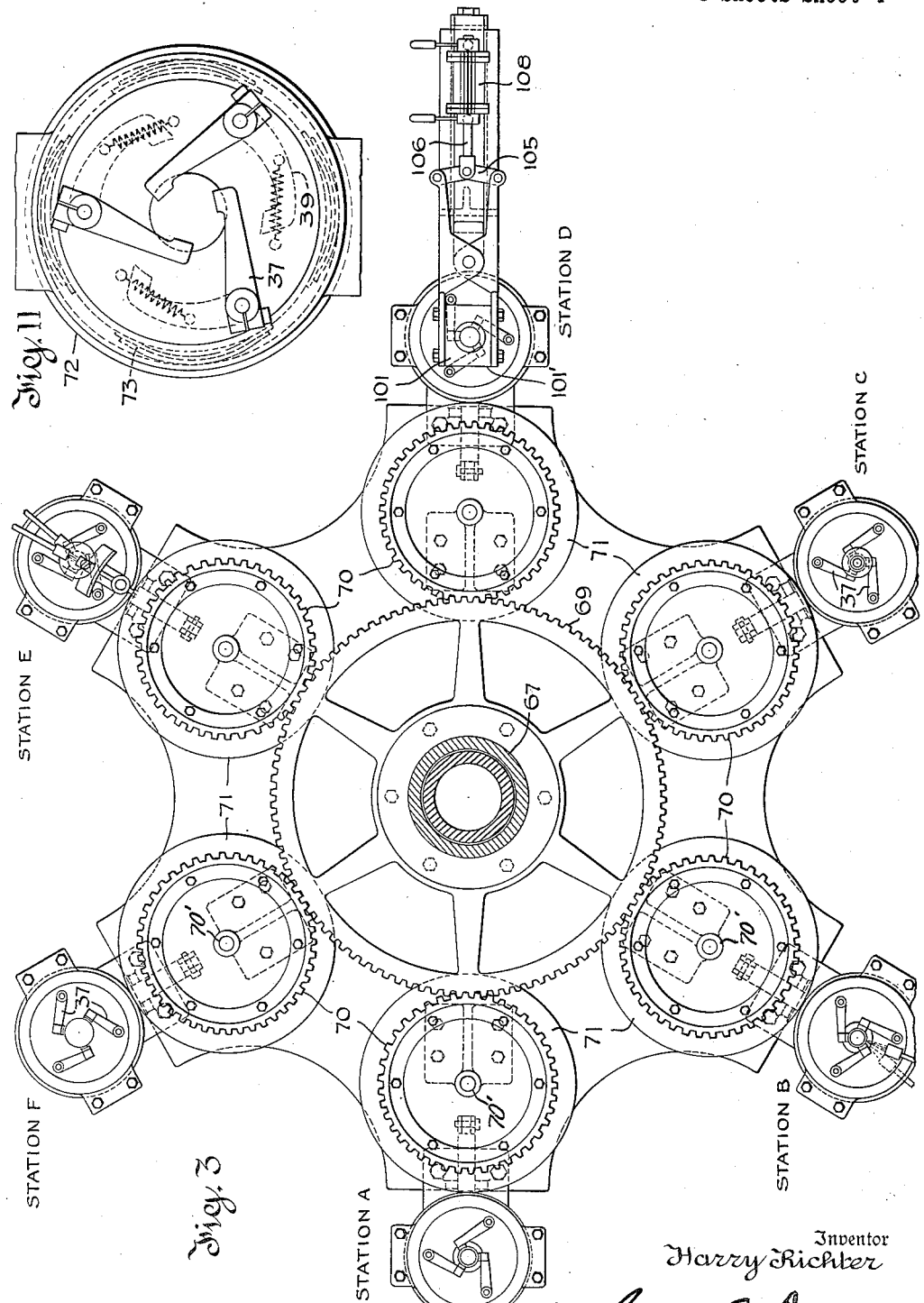
Fig. 3 is a section taken on line 3—3 of Fig. 1 showing particularly chuck rotating mechanisms.

At station D, Figs. 1, 3 and 7, there is shown the mechanism for initially forming a foot on the blank, the ends of the blank still being relatively hot when the blank reaches this station. When the indexing movement has terminated and while rotation of the chuck is arrested, a hollow plunger 99 is inserted in the blank from the lower end thereof and positioned with its upper end in predetermined adjacent relation to the end of the blank. Within the hollow plunger is a second plunger 100, the head 100' of which is substantially that of the inner diameter of the blank and is of such shape that the formation of fillets at the junction of the side walls and the bottom is controlled to provide a predetermined cross section. The halves 101, 101' of a mold are then moved into abutting relation adjacent the beaded end of the blank, and a gob of molten glass, indicated at 102, is then cut off from glass gathered on punty 103 by shears 104 and dropped into the mold. The closing of the mold halves is timed with the other operations and, as shown in Figs. 1 and 3, is effected by a toggle 105 pivotally connected to plunger 106 having thereon a piston 107 actuated by compressed air supplied to cylinder 108 through hose connections 109, 109'. Immediately after the gob of molten glass has been deposited in the mold a die 111 having a semispherical end face and attached to the lower end of plunger 112 is lowered preliminarily to form a foot on the cylinder. The mechanism for reciprocating die 111 includes a piston 113 in cylinder 114 to which compressed air is supplied through hose connections 115, 115'. It will be seen that the plunger also carries a cross arm 116, the latter being apertured to receive guide pins 117 which are slidable in the cross arm. These pins are secured to a second cross arm 118 and adjustably threaded on the pins are nuts 119 between which and cross arm 116 are springs 121. Cross arm 118 is slidable with respect to the die 111 and carries a ring 122 which cooperates with the die and mold to form a straight annular end on the formed foot.

The cup-shaped die and ring are employed to permit rectilinear movement of the ring axially of the mold, thus insuring a symmetrically formed foot. It is apparent that there is lost motion between the ring and die so that the ring adjusts itself during the molding operation, although, while the die is being lowered, the ring moves therewith. It is apparent, of course, that the die and lower plunger head move in opposite directions toward the mold, plunger 99 having thereon a piston 123 reciprocable in cylinder 124 to which compressed air is supplied through hose connections 125, 125'. Plunger 100 also carries a piston 126 and an auxiliary cylinder 127 to which compressed air is supplied through hose connections 128, 128'. Hence, it will be seen that head 100' is first moved into the blank by plunger 99 after which it is brought into molding position by plunger 100.

It is further to be noted that the mold halves 101, 101' are pivoted on a slide 129 mounted on bracket 130, the mold being advanced and withdrawn by plunger 131 connected thereto. Plunger 131 carries a piston 132 in cylinder 133 to which compressed air is supplied through hose connections 134, 134'.

Axial movement of plungers 99 and 112 is limited by engagement of pistons 113 and 123 with the ends of cylinders 114 and 124. Vertical adjustment of cylinders 114 and 124 is provided accurately to position die 111 and head 100' with respect to the mold halves 101, 101'. It will be seen that cylinder 114 is threaded in nut 135 secured to bracket 136 on spider 21 by collar 137. By turning the nut 135, cylinder 114 may be raised or lowered. Cylinder 124 is provided with a flange 138 having slots 139 therein through which bolts 141 pass. It will be apparent that this arrangement permits vertical adjustment of cylinder 124.

In Fig. 8, station E, there is illustrated the subsequent step of shaping the pressed semispherical cup-shaped foot to form a substantially frusto-conical base 142 for the shaped blank or jar 23. Burners 143, 143', having gas connectoins 144, reheat the foot to soften the same, after which an axially movable carbon tool 145 carried by plunger 146 is brought into engagement with the foot by piston 147 in fluid pressure cylinder 148 to which compressed air is supplied through hose connections 149, 149'. The opposite side of the base is shaped by a stationary but adjustable tool 151 mounted on rod 152 and secured thereto by set screws 153, 153'. It will be seen that tool 151 also shapes the outer corner formed by the angle between the base and the cylindrical body of the jar. The burners 143, 143' and cylinder 148 are supported by brackets 154, 155, respectively, these brackets being secured to spider 21.

After the base has been shaped the jar is removed at station F (Fig. 9) by a vertically reciprocable take-off clamp similar to and operable in the same manner as clamp 15 shown in Fig. 1a. For this reason the parts thereof have been given the same reference numerals. The operator removes the finished jar after it has been elevated from the chuck by the clamp at station F.

Figure 4:
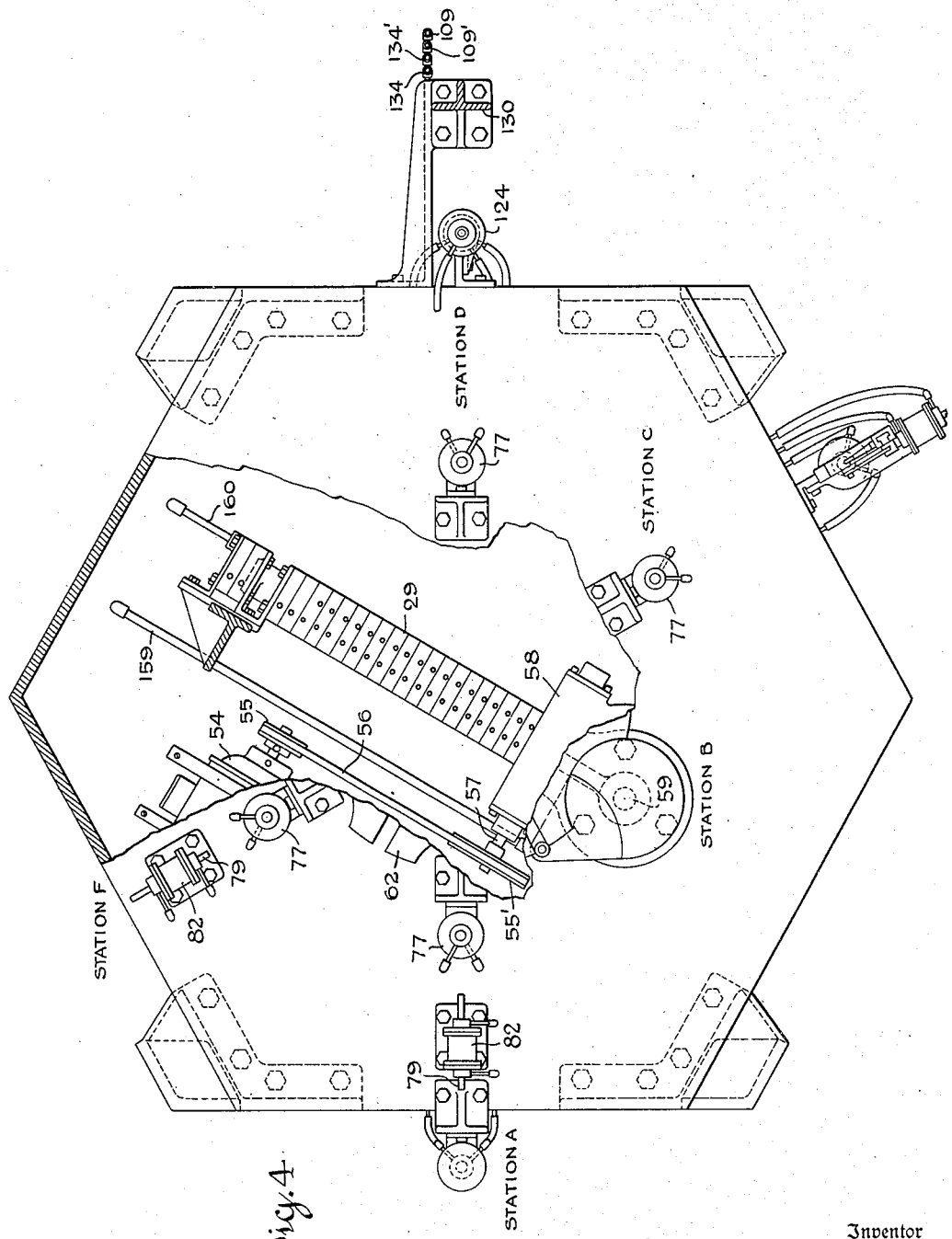
Fig. 4 is a top plan view, certain parts being broken away, of the base, showing the bank of valves for operating the several fluid operated devices of the machine.
Figure 12:
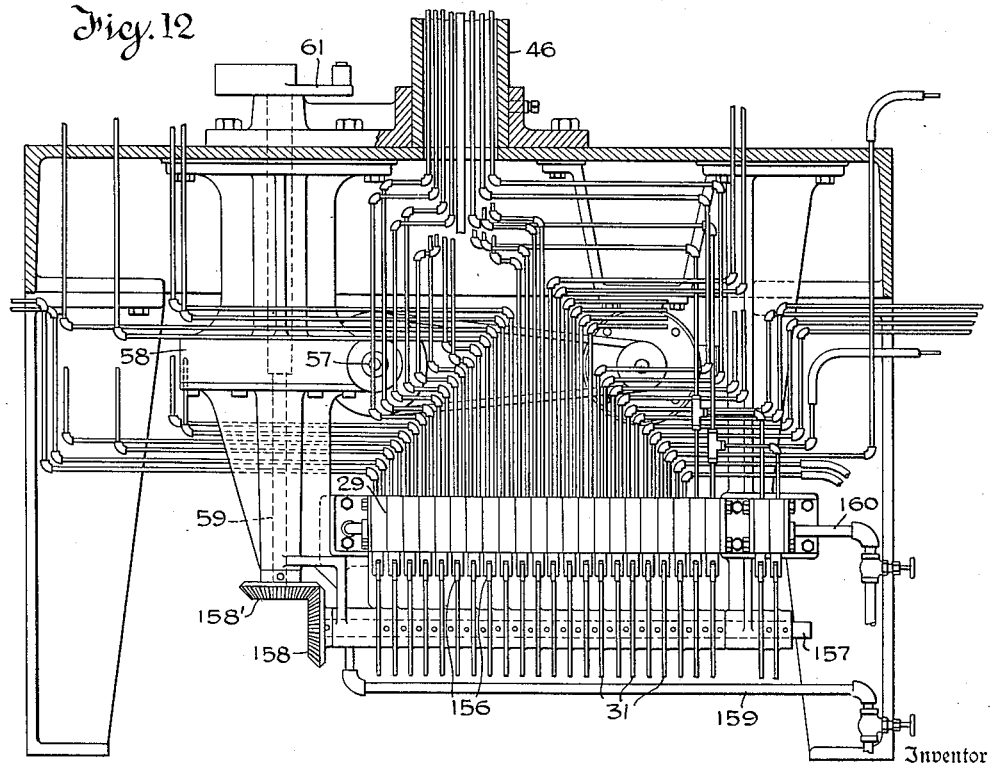
Fig. 12 is a section taken through the base showing the bank of valves and cam mechanism for actuating the valves.

It is to be understood that the various fluid operated cylinders and the burners are supplied with air and gas at predetermined timed intervals and in synchronism with the indexing of the chucks. For the purpose of supplying and cutting off these supplies, there is provided the bank of valves 29, each of which has a follower 156, and actuated by cams 31 on cam shaft 157, as shown in Figs. 1, 4, and 12. This shaft is driven through gears 158, 158', the latter on shaft 59. Compressed air and gas are supplied to the valves by pipes 159 and 160 respectively.

The method and apparatus described is capable of forming a footed cylinder in which certain disadvantages present in prior methods are eliminated. In addition to the controlled formation of fillets, the invention provides for reducing to a minimum the strains set up at the junction of the foot with the walls of the cylinder. It is obvious that the deposition and sealing of molten glass to a jar on which the bottom has already been formed creates certain strains on cooling due to unequal wall and bottom thicknesses. In the present invention the foot is sealed only to an open end of the cylinder. The controlled formation of the bottom insures a constant cross section taken axially of the jar so that it is unnecessary to make preliminary tests before incising the graduations on the jar. The elimination of this last mentioned step results in a considerable saving in the production of graduates of the type referred to herein.

While the invention has been shown and described with respect to a preferred embodiment thereof, it is not intended that it be limited to the exact arrangement of parts, but may be modified to meet varying conditions of production. The invention is, therefore, to be construed as falling broadly within the definition thereof as set forth in the claims.

What I claim is:

1. A machine for footing a substantially cylindrical blank having each end thereof open, comprising a chuck for holding said blank, a shaping head insertable through one open end of the blank, a reciprocable motor for moving said head into adjacent relation with the other open end of the blank, a partible mold engageable with said other end of the blank, a reciprocable motor for retracting the sections of said partible mold and for alternately moving the sections into closed and separated relation, a substantially semi-spherical member movable into cooperating relation with said head and said mold, and a reciprocable motor for moving said semi-spherical member into shaping relation with respect to said mold.

2. A machine for footing a substantially cylindrical blank having each end thereof open, comprising a chuck for supporting said blank with its axis disposed vertically, a shaping plunger insertable through the lower open end of said blank, a reciprocable motor for moving said plunger into adjacent relation with the upper end of said blank, a partible mold engageable with said upper end, a reciprocable motor for retracting the sections of said partible mold and for alternately moving the sections into closed and separated relation, a substantially semi-spherical member for shaping a foot on said upper end, and a reciprocable motor for moving said member downwardly toward and into shaping relation with said mold.

3. A machine of the type defined in claim 2 in which said supporting chuck is rotatably mounted, together with an intermittently operated clutch for rotating said chuck.

4. A machine for footing a substantially cylindrical blank having each end thereof open, comprising a chuck for supporting said blank with its axis disposed vertically, a shaping plunger insertable through the lower open end of said blank, a reciprocable motor for moving said plunger into adjacent relation with the upper end of said blank, a partible mold engageable with said upper end, a reciprocable motor for retracting the sections of said partible mold and for alternately moving the sections into closed and separated relation, a substantially semi-spherical member for shaping a foot on said upper end, a reciprocable motor for moving said foot shaping member downwardly toward and into shaping relation with said mold, said motor for moving said shaping plunger and foot shaping member each including a cylinder and a fluid operated piston, and an adjustable clamp for varying the positions of said cylinders axially thereof.

HARRY RICHTER.

REFERENCES CITED

The following references are of record in the file of this patent:

UNITED STATES PATENTS

| Number | Name | Date |
|---|---|---|
| 557,105 | Bridges | Mar. 31, 1896 |
| 1,147,539 | O'Neill | July 20, 1915 |
| 1,436,197 | Rohland | Nov. 21, 1922 |
| 1,889,390 | Throm | Nov. 29, 1932 |
| 1,979,572 | Pedersen et al. | Nov. 6, 1934 |
| 2,001,436 | Schutz | May 14, 1935 |
| 2,235,129 | Vining et al. | Mar. 18, 1941 |
| 2,289,999 | Schutz | July 14, 1942 |
| 2,327,825 | Schutz | Aug. 24, 1943 |

FOREIGN PATENTS

| Number | Country | Date |
|---|---|---|
| 533,687 | Great Britain | Feb. 18, 1941 |